(12) United States Patent
Yoshimura

(10) Patent No.: US 12,030,004 B2
(45) Date of Patent: Jul. 9, 2024

(54) FILTER HOUSING THAT ACCEPTS BOTH SINGLE OPEN END O-RING AND DOUBLE OPEN END FILTER ELEMENTS

(71) Applicant: Steven T. Yoshimura, Torrance, CA (US)

(72) Inventor: Steven T. Yoshimura, Torrance, CA (US)

(73) Assignee: Parker-Hannifin Corporation, Cleveland, OH (US)

( * ) Notice: Subject to any disclaimer, the term of this patent is extended or adjusted under 35 U.S.C. 154(b) by 1280 days.

(21) Appl. No.: 16/209,745

(22) Filed: Dec. 4, 2018

(65) Prior Publication Data
US 2019/0168141 A1     Jun. 6, 2019

Related U.S. Application Data

(60) Provisional application No. 62/594,388, filed on Dec. 4, 2017.

(51) Int. Cl.
*B01D 29/17* (2006.01)
*B01D 29/23* (2006.01)
(Continued)

(52) U.S. Cl.
CPC ........... *B01D 35/303* (2013.01); *B01D 29/17* (2013.01); *B01D 29/23* (2013.01); *B01D 29/56* (2013.01);
(Continued)

(58) Field of Classification Search
CPC ...... B01D 35/303; B01D 35/30; B01D 29/56; B01D 29/23; B01D 35/301; B01D 29/17;
(Continued)

(56) References Cited

U.S. PATENT DOCUMENTS 5,342,519 A     8/1994  Friedmann et al.
5,715,699 A *   2/1998  Coates ................. B01D 35/153
                                                          62/338
(Continued)

FOREIGN PATENT DOCUMENTS

WO     WO-2009149190 A1 * 12/2009  ............. B01D 29/11

OTHER PUBLICATIONS

"Remove." Merriam-Webster.com Dictionary, Merriam-Webster, https://www.merriam-webster.com/dictionary/remove. Accessed Oct. 14, 2021. (Year: 2021).*

(Continued)

*Primary Examiner* — Joseph W Drodge
(74) *Attorney, Agent, or Firm* — Reinhart Boerner Van Deuren P.C.

(57) ABSTRACT

A housing assembly, portable filter system using the housing assembly and methods of mounting a filter element in a housing assembly are provided. The housing assembly is usable with filter elements of different types. The housing assembly includes a housing body having an open end and being attached to a filter head. The filter head includes a first housing sealing interface configured to sealingly mate with a filter element of the first type and a second housing sealing interface configured to sealingly mate with a filter element of the second type. A cover member removably attaches to the housing body and includes a third housing sealing interface configured to sealingly mate the filter element of the second.

20 Claims, 12 Drawing Sheets

(51) Int. Cl.
  *B01D 29/56* (2006.01)
  *B01D 29/96* (2006.01)
  *B01D 35/02* (2006.01)
  *B01D 35/30* (2006.01)

(52) U.S. Cl.
  CPC ........... *B01D 29/96* (2013.01); *B01D 35/023* (2013.01); *B01D 35/30* (2013.01); *B01D 35/301* (2013.01); *B01D 2201/29* (2013.01); *B01D 2201/291* (2013.01); *B01D 2201/301* (2013.01); *B01D 2201/303* (2013.01); *B01D 2201/304* (2013.01); *B01D 2201/306* (2013.01); *B01D 2201/307* (2013.01); *B01D 2201/31* (2013.01); *B01D 2201/342* (2013.01); *B01D 2201/347* (2013.01)

(58) Field of Classification Search
  CPC .................. B01D 29/96; B01D 35/023; B01D 2201/303; B01D 2201/342; B01D 2201/291; B01D 2201/301; B01D 2201/347; B01D 2201/304; B01D 2201/306; B01D 2201/307; B01D 2201/31; B01D 2201/29

See application file for complete search history.

(56) References Cited

U.S. PATENT DOCUMENTS

| | | | |
|---|---|---|---|
| 8,127,934 | B2 | 3/2012 | Stamey, Jr. et al. |
| 8,256,625 | B2 | 9/2012 | Sahasrabudhe et al. |
| 8,465,643 | B2 | 6/2013 | Beard et al. |
| 8,709,247 | B2 | 4/2014 | Beard et al. |
| 9,468,870 | B2 | 10/2016 | Stamey, Jr. et al. |
| 2002/0104794 | A1* | 8/2002 | Hoffmann ............... C02F 1/003 210/323.2 |
| 2014/0190881 | A1* | 7/2014 | Ardes .................. B01D 35/147 210/248 |
| 2014/0238920 | A1* | 8/2014 | Ergican .................. C02F 1/001 210/232 |
| 2016/0296860 | A1 | 10/2016 | Thalmann et al. |
| 2017/0136412 | A1 | 5/2017 | Huda et al. |

OTHER PUBLICATIONS

"Removed." Merriam-Webster.com Dictionary, Merriam-Webster, https://www.merriam-webster.com/dictionary/removed. Accessed Oct. 14, 2021. (Year: 2021).*
Parker Hannifin Corporation; Fulflo Honeycomb Filter Cartridges C-1000; 2007; 4 pages (67-70).
Parker Hannifin Corporation; Fulflo Poly-Mate Plus Cartridges C-2044; 2007; 2 pages (23-24).

* cited by examiner

US 12,030,004 B2

FILTER HOUSING THAT ACCEPTS BOTH SINGLE OPEN END O-RING AND DOUBLE OPEN END FILTER ELEMENTS

CROSS-REFERENCE TO RELATED PATENT APPLICATION

This patent application claims the benefit of U.S. Provisional Patent Application No. 62/594,388, filed Dec. 4, 2017, the entire teachings and disclosure of which are incorporated herein by reference thereto.

FIELD OF THE INVENTION

This invention generally relates to filter systems and filter housings for mounting filter elements as well as portable filtering systems and methods of assembling the same.

BACKGROUND OF THE INVENTION

Filter systems are used to filter fluids to prevent damage or reduction in performance of downstream systems or to otherwise clean a fluid such as for drinking water. Many filter systems include a filter head to which one or more replaceable filter elements are mounted. Once the filter element is spent (e.g. a filter media thereof is full of impurities), the filter element can be removed and replaced without having to replace the entire filter system.

Some particular filter systems include filter housings that define a filter head and a filter bowl that attaches to the filter head. The filter head and filter bowl are both reusable. A replaceable filter element, also referred to as a filter cartridge, is located within the filter bowl during use. Many water filter designs use such a filter housing. Unfortunately, this can require the removal of the filter bowl during replacement. Removal of the entire bowl can be very problematic if the filter housing is not oriented with filter bowl mounted directly below the filter head and particularly if the filter bowl and filter head are oriented in a horizontal orientation. Once the bowl is removed all of the fluid will flow out of the filter housing. This problem can be further amplified if the fluid will flow into a location where it is undesirable to have fluid.

Further, there are numerous types of water filters that use different sealing interfaces to seal with a corresponding filter head. As such, if the wrong filter element is obtained to replace a spent filter element, the new filter element may not properly mate with the filter housing.

This issue can be further complicated if the filter system forms part of a portable filter system. Portable filter systems, such as for filtering water, may be used in very remote areas or during times of disaster when potable water is not readily available. Unfortunately, this can lead to the difficulty in finding the necessary replacement filter for a particular filter housing.

The present invention relates to improvements over the current state of the art.

BRIEF SUMMARY OF THE INVENTION

An embodiment of the invention provides a universal filter housing assembly that can be used with multiple different filter elements. More particularly, an implementation provides a filter housing assembly for use with a first type of filter element and a second type of filter element. The first type of filter element has a first sealing interface at a first end of a first tube of filter media. The second type of filter element has a second sealing interface at a first end of a second tube of filter media and has a third sealing interface at a second end of the second tube of filter media. The first sealing interface is configured differently than the second sealing interface. The filter housing assembly includes a housing body, a filter head and a cover member. The housing body extends axially between a first end and an open second end. The housing body defines a filter element mounting cavity. The filter head is at the first end of the housing body. The filter head includes first and second housing sealing interfaces. The first housing sealing interface is configured to sealingly mate with a first sealing interface when a filter element of the first type is located within the filter element mounting cavity. The second housing sealing interface is configured to sealingly mate with a second sealing interface when a filter element of the second type is located within the filter element mounting cavity. The cover member is removably attachable to the second end of the housing body. This allows for replacement of spent filter elements. The cover member includes a third housing sealing interface configured to sealingly mate with a third sealing interface when the filter element of the second type is located within the filter element mounting cavity.

In one embodiment, the first and second housing sealing interfaces are provided by a first annular wall. One of the first and second housing sealing interfaces is provided by a radially directed surface of the first annular wall. The other one of the first and second housing sealing interfaces is provided by an axially facing annular surface of the first annular wall. The axially facing annular surface axially faces the cover member.

In one embodiment, the third housing sealing interface is an axially facing surface provided by the cover member axially facing the first end.

In one embodiment, the axially facing surface is provided by an annular rib projecting axially towards the filter head.

In one embodiment, the first housing sealing interface is provided by the radially directed surface of the first annular wall and the radially directed surface of the first annular wall is a radially inward directed surface.

In one embodiment, a first port is provided, at least in part, by a second annular wall that is concentric with the first annular wall. The first and second annular walls defining an annular channel radially therebetween. The radially directed surface radially faces inward toward the second annular wall.

In one embodiment, the annular surface has an inner diameter of between about 1.7 and 1.8 inches.

In one embodiment, the axially facing annular surface of the first annular wall that provides the second housing sealing interface is dimensioned to contact in a sealing manner a second sealing interface of a filter element of the second type having an inner diameter of 1.25 and an outer diameter of 2.5 inches.

In one embodiment, the second housing sealing interface is provided by a tapered end portion of the first annular wall.

In one embodiment, the housing body provides a threaded region and a radially inward directed annular sealing surface having a first axial dimension. The cover member has an axially extending neck that is received axially within the second end of the housing body. The neck has a threaded region configured to engage the threaded region of the housing body. The neck carries a radially directed cover seal member. The radially directed cover seal member is radially engageable with the radially inward directed annular sealing surface along the first axial dimension such that the axial position of the cover member may be adjusted relative to the housing body to accommodate different length filter elements within the housing body with the radially inward directed annular sealing surface remaining in sealing engagement with the radially directed cover seal member.

In one embodiment, the axial position of the cover may be adjusted by at least 0.125 inches relative to the housing body with the radially inward directed annular sealing surface remaining in sealing engagement with the radially directed cover seal member. More preferably, the axial position is adjustable by at least 0.25 inches.

In one embodiment, the housing body is provided by an axially extending annular pipe extending between first and second ends and an annular collar member. The first end is adjacent the filter head and the second end of the annular pipe is attached to the annular collar member. The annular collar member defines the open second end of the housing body. The cover member removably attaches to the collar member.

In one embodiment, the cover member includes a closed end and an axially extending neck extending axially from the closed end. The axially extending neck extends axially through the open second end when the cover member is attached to the housing body. The closed end includes a handle sized for a user's hand to grip the cover member for attaching the cover member to or detaching the cover member from the housing body. The handle is defined in part by axially recessed pockets formed by the closed end.

In one embodiment, the housing body includes a radially extending projection defining an axial abutment. The radially extending projection and axial abutment are axially offset from the open second end toward the first end.

In one embodiment, the first and second housing sealing interfaces surround, at least part of, the first port.

In another embodiment, a filter apparatus for use with a filter element is provided. The apparatus includes a containment enclosure and a filter housing assembly located within the containment enclosure. The containment enclosure defines an enclosed volume defined at least in part by a first sidewall. The first sidewall including a first access opening. The containment enclosure also includes a dirty fluid inlet and a clean fluid outlet. The filter housing assembly includes an housing body, a filter head and a cover member. The housing body extends axially between a first end and an open second end. The housing body defines a filter element mounting cavity. The open second end cooperates with the first access opening such that the filter element mounting cavity is accessible from the exterior of the containment enclosure through the first access opening and the open second end. The filter head is at the first end of the housing body. The filter head includes a first port in fluid communication with the filter element mounting cavity and a second port in fluid communication with the filter element mounting cavity. One of the first and second ports is in operable fluid communication with the dirty fluid inlet and the other one of the first and second ports is in operable fluid communication with the clean fluid outlet. The cover member removably attaches to the second end of the housing body. The cover member closing all or a portion of the first access opening when it is attached to the housing body. The cover member therefore provides a portion of the exterior surface of the filter apparatus in use.

In one embodiment, the filter housing assembly is configured for use with a first type of filter element having a first sealing interface at a first end of a first tube of filter media and alternatively for use with a second type of filter element having a second sealing interface at a first end of a second tube of filter media and having a third sealing interface at a second end of the second tube of filter media. The first sealing interface is configured differently than the second sealing interface. The filter housing assembly further includes first and second housing sealing interfaces. The first housing sealing interface is configured to sealingly mate with a first sealing interface of the filter element when the filter element is of the first type and is located within the filter element mounting cavity. The second housing sealing interface is configured to sealingly mate with a second sealing interface of the filter element when the filter element is of the second type and is located within the filter element mounting cavity. The cover member further includes a third housing sealing interface configured to sealingly mate with a third sealing interface of the filter element when the filter element is of the second type and is located within the filter element mounting cavity.

In one embodiment, the housing body includes a radially extending projection defining an axial abutment that abuts an inner surface of the first sidewall surrounding the access opening.

In one embodiment, the radially extending projection and axial abutment are axially offset from the open second end toward the first end. A portion of the housing body axially between the axial abutment and the second end extends axially through the first access opening.

In one embodiment, the cover member includes an axially extending neck that extends axially through the open second end and the first access opening when the cover member is attached to the housing body.

In one embodiment, the housing body has a threaded region that engages a threaded region of the neck to secure the cover member to the housing body. The open second end has an inner diameter. The cover member has a maximum diameter that is smaller than the inner diameter of the second end. This allows the cover member to be receivable completely axially into the housing body through the second end.

In one embodiment, the cover member includes a closed end and an axially extending neck extending axially from the closed end. The axially extending neck extends axially through the open second end when the cover member is attached to the housing body. The closed end includes a handle sized for a user's hand to grip the cover member for attaching the cover member to or detaching the cover member from the housing body. The handle is defined in part by axially recessed pockets formed by the closed end.

In one embodiment, at least 80% of a volume defined by the filter head, filter housing body and the cover is located within the containment enclosure, and more preferably at least 85%, even more preferably at least 90% and even more preferably at least 95%.

In another embodiment, a method of mounting a filter element in a filter housing assembly is provided. The method includes inserting a filter element into a filter housing assembly as described above. The filter element is of either the first type or of the second type. The method including sealingly engaging the filter element to the filter head. This includes engaging the first sealing interface with the first housing sealing interface if the filter element is of the first type or engaging the second sealing interface with the second housing sealing interface if the filter element is of the second type. The method includes attaching the cover member to the housing body to close the second end of the housing body.

In one method, the method includes engaging the third housing sealing interface with the third sealing interface if the filter element is of the second type. This may occur when the cover member is mounted to the housing body.

In one method, the first housing sealing interface is left unused if the filter element is of the second type and the second housing sealing interface is left unused if the filter element is of the first type.

In one method, the filter housing assembly is located within a containment enclosure of a fluid filtering apparatus as outlined above. The step of inserting a filter element into the filter housing assembly includes passing the filter element through both the access opening and the open second end. Attaching the cover member causes the cover member to form part of the exterior of the containment enclosure.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
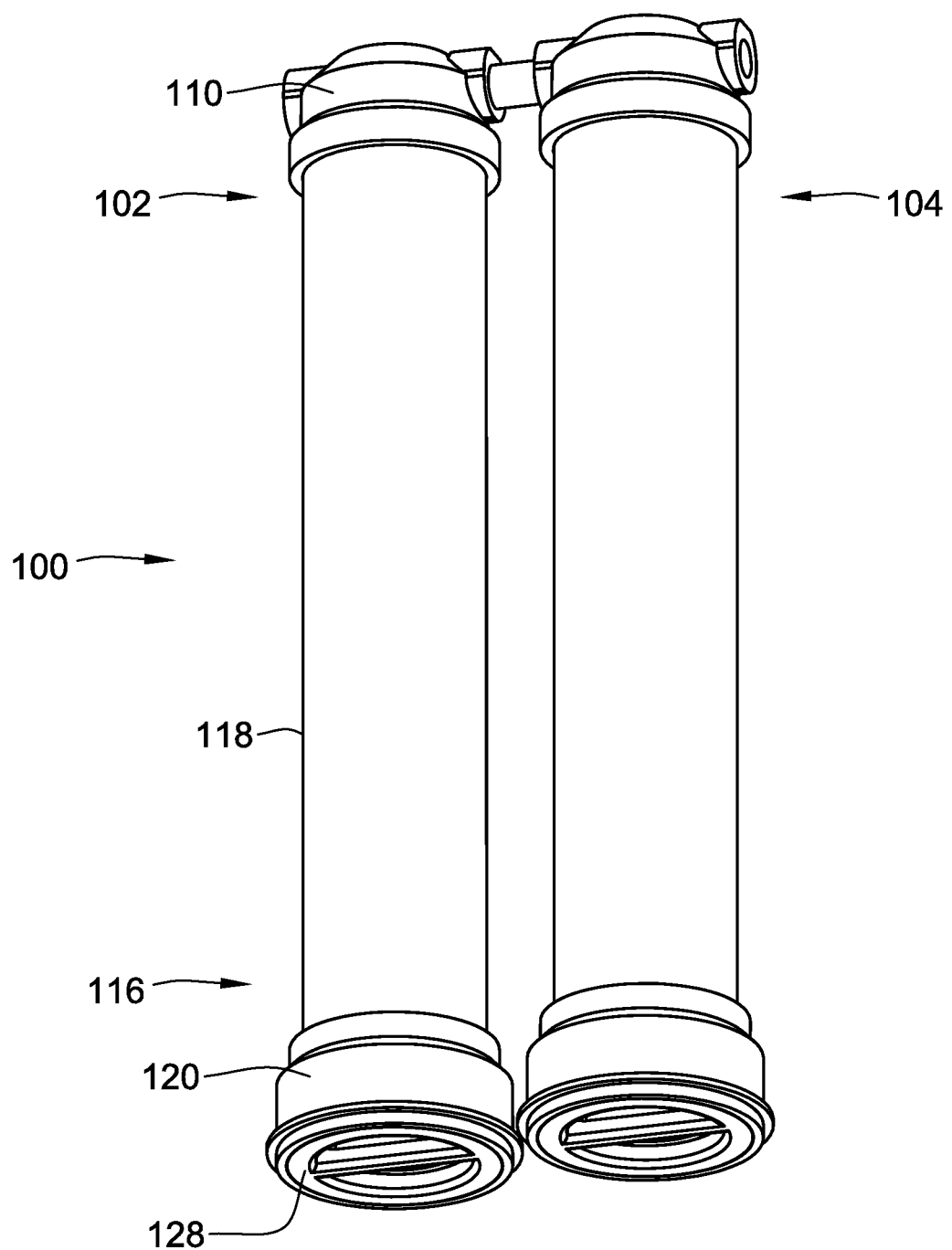
FIG. 1 is a filter system according to an embodiment of the invention.

FIG. 1 illustrates a filter system 100 according to an embodiment of the invention. The filter system 100 includes first and second filter housing assemblies 102, 104. While a pair of filter housing assemblies is illustrated, other embodiments could incorporate more or less than two filter housing assemblies. The filter system 100 finds particular use in filtering water.

Figure 2:
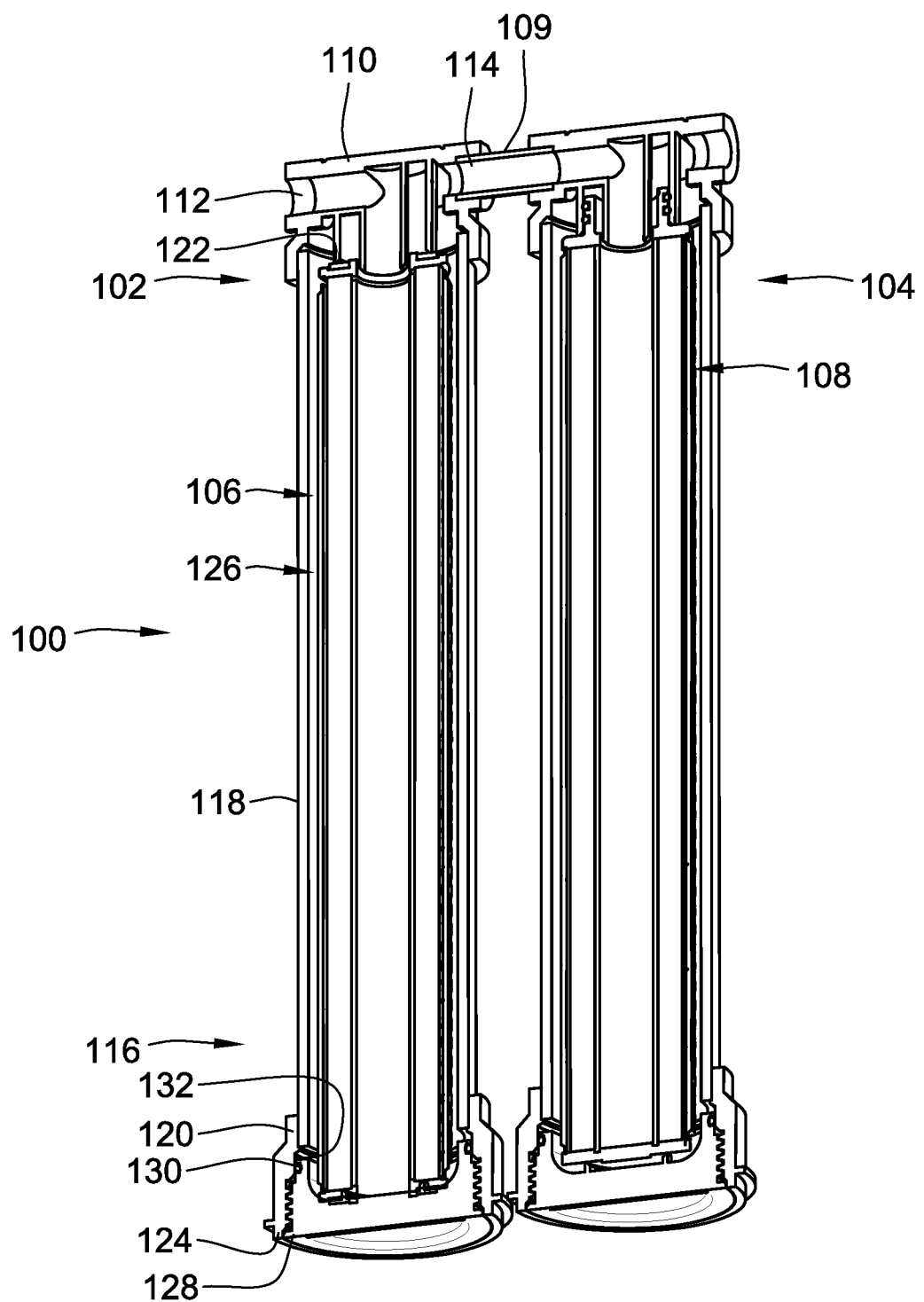
FIG. 2 is a cross-sectional illustration of the filter system of FIG. 1.

With additional reference to FIG. 2, the filter housing assemblies 102, 104 are substantially identical. The filter housing assemblies 102, 104 are configured to receive two different types of filter elements 106, 108 as will be described in more detail below. For illustrative purposes, the first filter housing assembly 102 has filter element 106 of a first type mounted therein while second filter housing assembly 104 has filter element 108 of a second type mounted therein. However, both filter housing assemblies 102, 104 are configured to cooperate with either filter element 106 or filter element 108. This provides significant flexibility as a user can use either type of filter element and not worry if the correct type of element has been obtained. Further, while filter system 100 is illustrated using one each of the different types of filter elements (e.g. filter elements 106 and 108), in operation, the filter system 100 could use filter elements of the same type, e.g. both elements could be like filter element 106 or both elements could be like filter element 108. Further, filter elements 106, 108 could be in the other filter housing assembly than as illustrated.

In this embodiment, the filter housing assemblies 102, 104 are connected in series with a connection pipe 109. As such, fluid will flow in series through both filter elements 106, 108. Simply for purposes of explanation, filter housing assembly 102 will be upstream of filter housing assembly 104 such that fluid first flows through filter housing 102 and then through filter housing 104. However, the fluid flow could be reversed in other situations.

The following will be an explanation of the filter housing assemblies 102, 104. Because the filter housing assemblies 102, 104 are identical, only filter housing assembly 102 will be explained.

Figure 3:
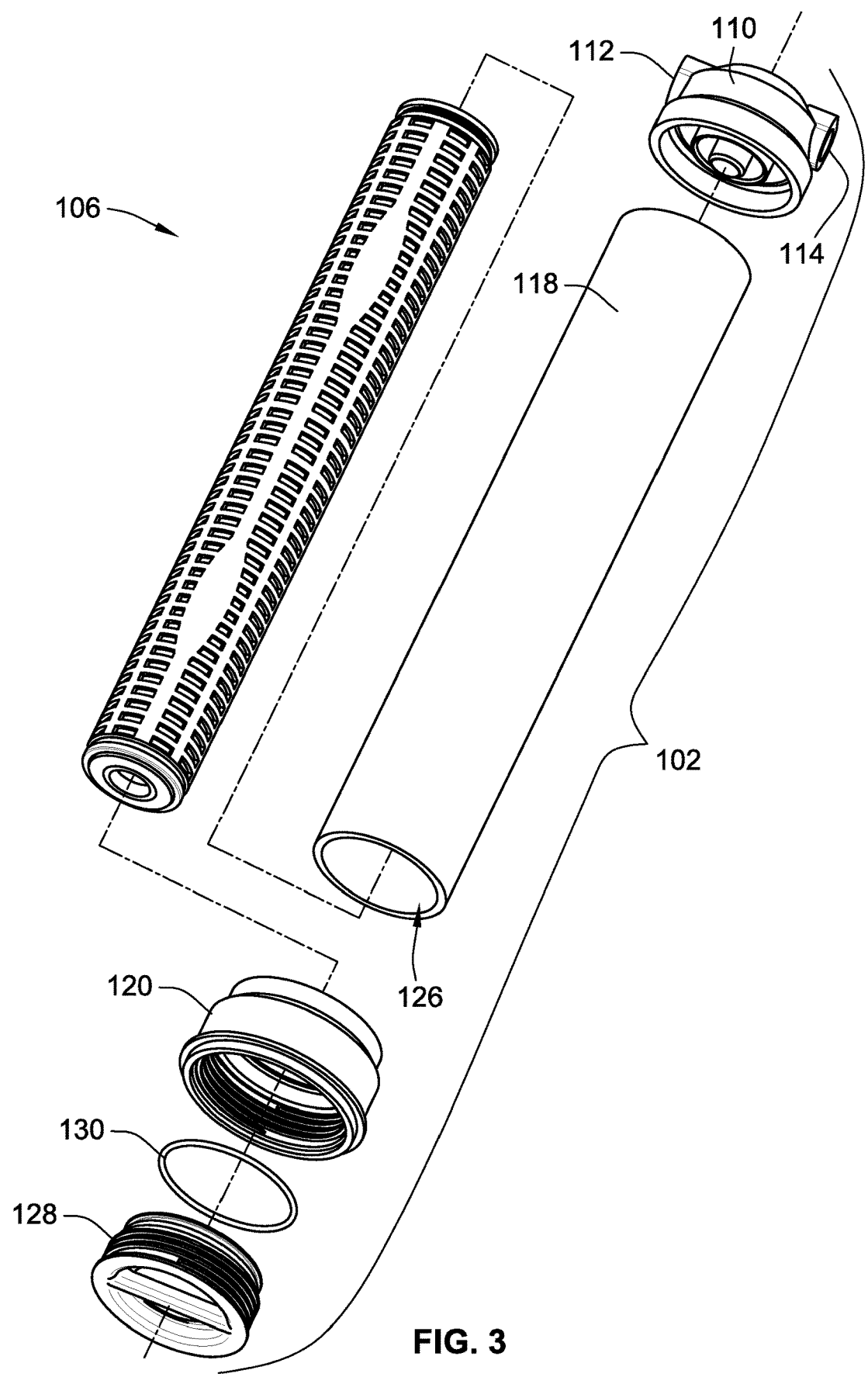
FIG. 3 is an exploded illustration of one of the filter housing assemblies of the filter system and one of the types of filter elements that may be used in the filter housing assembly.
Figure 4:
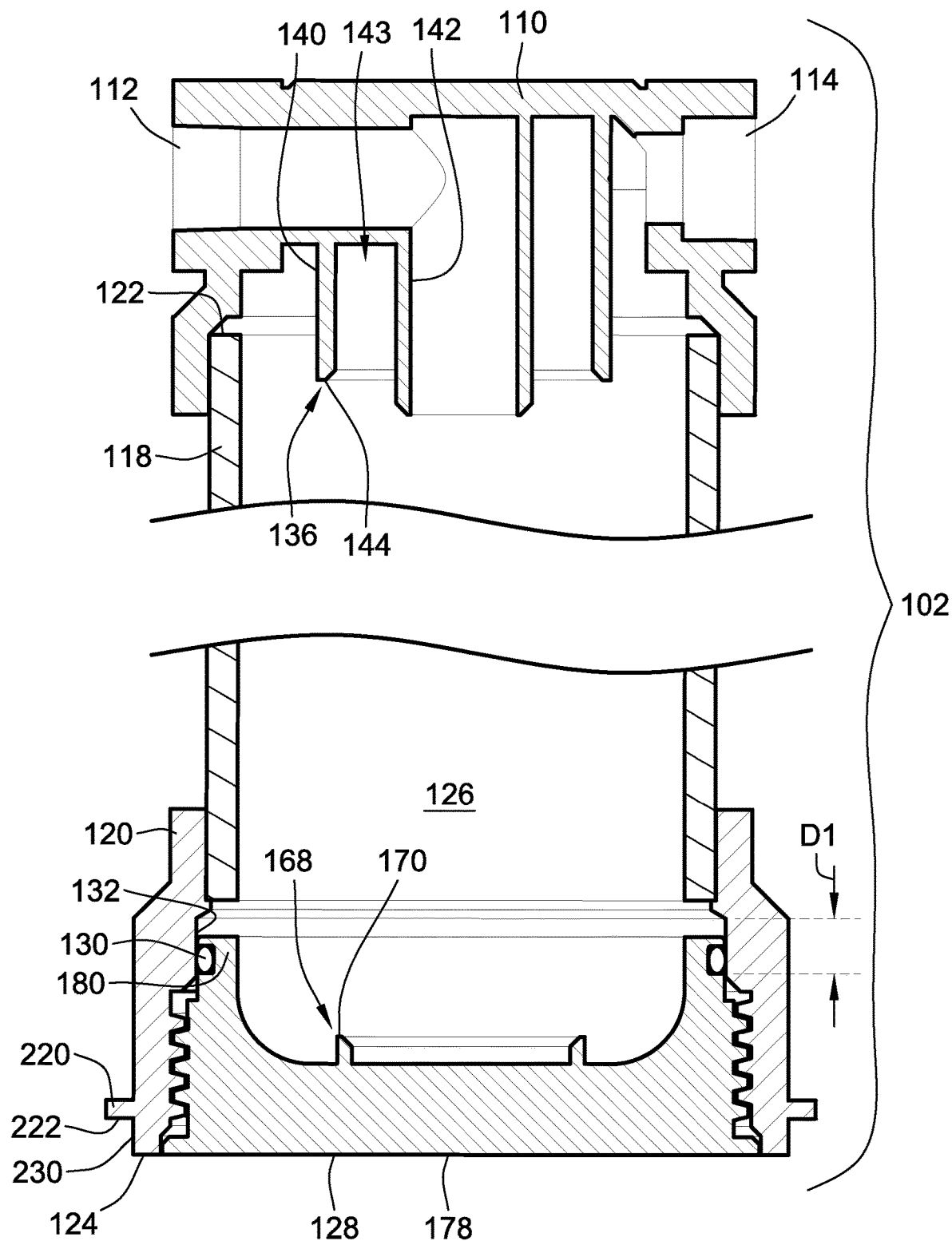
FIG. 4 is an enlarged partial cross-section illustration of the filter housing assembly of FIG. 3.

With reference to FIGS. 2-4, filter housing assembly 102 includes a filter head 110 that provides an inlet port 112 and an outlet port 114.

The filter housing assembly 102 includes a housing body 116 connected to the filter head 110. The housing body 116 includes an annular axially extending pipe 118 and an annular collar 120 attached to the axially extending pipe 118. The housing body 116 extends between opposed first and second ends 122, 124. The first end is defined by the pipe 118 and the second end is defined by the collar 120. The housing body 116 defines, at least in part, a filter element mounting cavity 126 that is in fluid communication with the inlet and outlet ports 112, 114. When installed, the filter element 106 is mounted within the filter element mounting cavity 126 operably separating the inlet and outlet ports 112, 114.

A cover member 128 removably attaches to the second end 124 of the housing body 116, which may be referred to as an open end, to close the second end 124 and the filter element mounting cavity 126. The cover member 128 carries a seal member 130 in the form of an o-ring that operably seals with a sealing surface 132. In an embodiment, the filter element is entirely axially received by the filter housing assembly such that no portion of the filter element extends axially out of the open second end 124 when the cover member 128 is removed.

The filter housing assembly 102, as noted above, is configured to work with filter elements of different types. As such and with additional reference to FIG. 5, the filter head 110 includes a first housing sealing interface 136 configured to sealingly mate with a first sealing interface 138 of the first filter element 106 when the first filter element 106 is located within the filter element mounting cavity 126.

The first housing sealing interface 136 is provided by an annular wall 140. In this embodiment, the annular wall 140 surrounds a second annular wall 142 that forms part of the inlet port 112. As the first annular wall 140 is spaced radially outward from the second annular wall 142 a groove 143 is formed therebetween. Preferably, the first and second annular walls 140, 142 are concentric with one another. In other embodiments, the second annular wall 142 is not included and the first annular wall 140 directly surrounds a portion of the inlet port 112. Again, port 112 could alternatively be an outlet port.

The first housing sealing interface 136 is provided by an axially facing annular surface 144 defined by a distal end of the annular wall 142. This axially facing annular surface 144 faces the cover member 128 and will form an axial seal with the first sealing interface 138. To increase the pressure between the first housing sealing interface 136 and first sealing interface 138, the axially facing annular surface 144 is provided by a tapered end portion 146 of the first annular wall 140. This end portion tapers towards the axially facing annular surface 144. While being illustrated as generally flat, the axially facing annular surface 144 could be curved or terminate in a point depending on the implementation.

In an embodiment, the radial location of the first housing sealing interface 136 is such that it can axially engage a first sealing interface 138 of the filter element 106 that has an inner radial diameter of approximately 1.25 inches and an outer radial diameter of approximately 2.5 inches.

Figure 5:
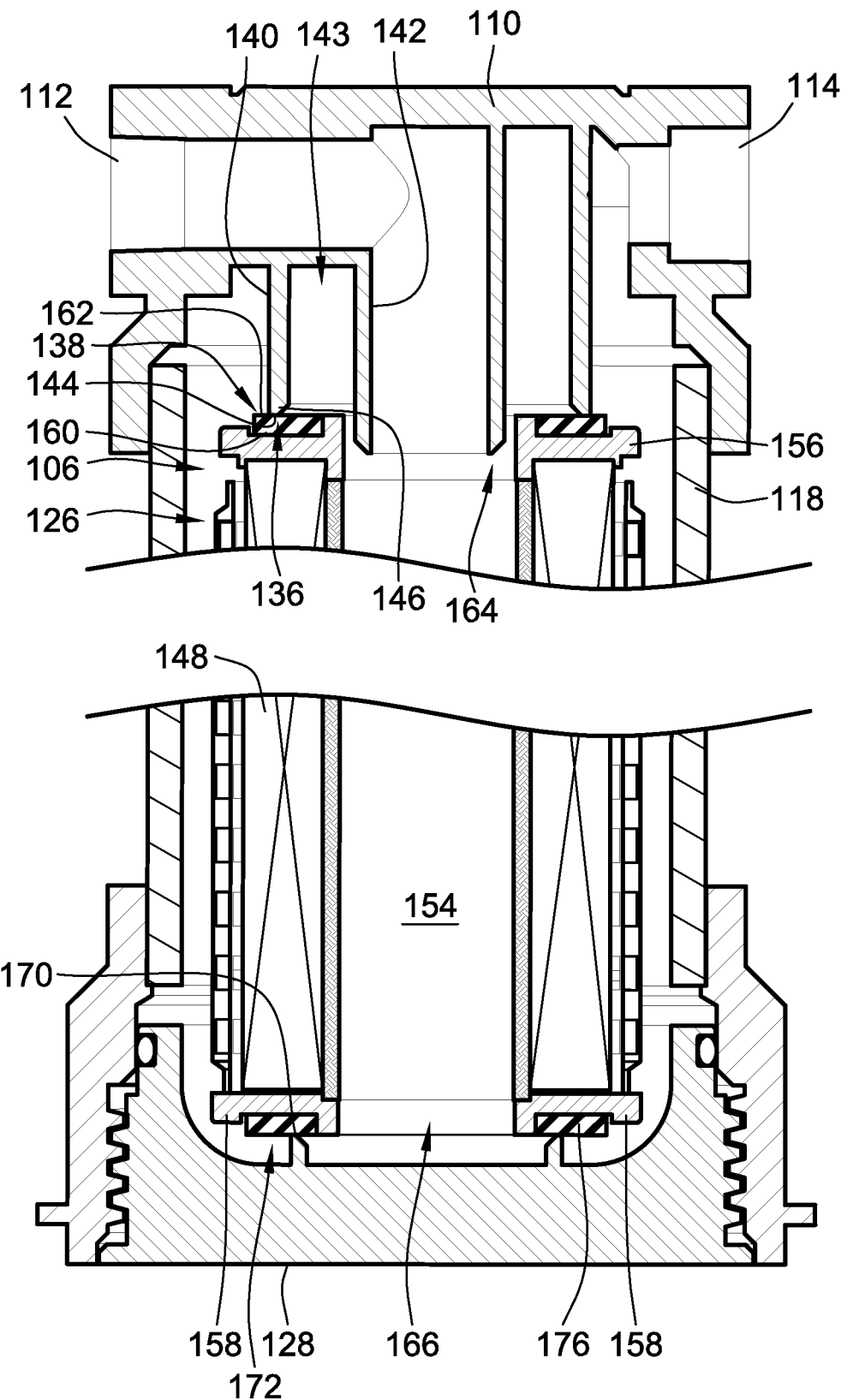
FIG. 5 is an enlarged partial cross-sectional illustration of the filter housing assembly and the filter element of the first type in FIG. 3.
Figure 6:
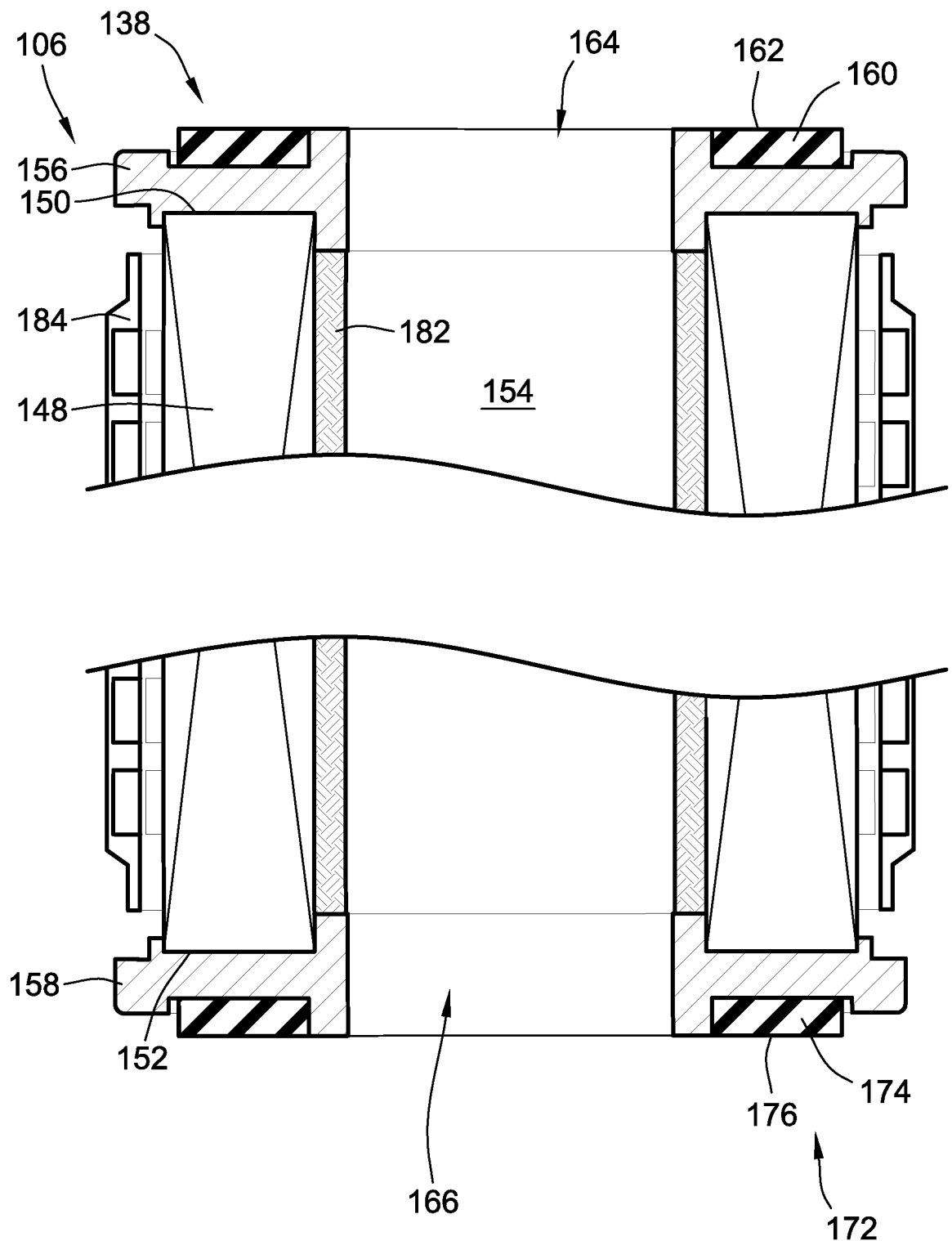
FIG. 6 is an enlarged partial cross-sectional illustration of the filter element of FIG. 5 removed from the filter housing assembly.

With reference to FIGS. 5 and 6, in the illustrated embodiment, the first filter element 106 includes an annular tube of filter media 148 that extends axially between first and second ends 150, 152 and that surrounds a central cavity 154. First and second end caps 156, 158 are attached to the first and second ends 150, 152, respectively. The end caps 156, 158 may be formed from any standard material such as for example metal, plastic or urethane. The end caps 156, 158 may be preformed or molded in place. The end caps 156, 158 could be adhesively adhered to the ends of the filter media 148, the ends of the filter media 148 could be embedded into the end caps 156, 158, the end caps 156, 158 could be molded directly to the ends of the filter media 148.

In the illustrated embodiment, a seal member 160 that provides the first sealing interface 138 is attached to the first end cap 156. The seal member 160 could alternatively be provided by the end cap 156 such as if the end cap 156 is formed by a urethane material and particularly if molded directly in place. In some embodiments, the first sealing interface 138 could simply be an end of the tube of filter media 148, e.g. if a yarn filter media is used. The first sealing interface 138 is an annular axially facing surface 162 provided by the seal member 160. This axially facing surface 162 will axially abut the axially facing annular surface 144 of the filter head 110. The engagement between sealing interfaces 136, 138 prevents fluid bypass between the filter head 110 and filter element 106.

The first and second end caps 156, 158 are or are substantially identical to one another such that the first filter element 106 can be installed with either end in engagement with the filter head 110.

The first and second end caps 156, 158 are annular end caps that define openings 164, 166 that fluidly communicate with central cavity 154. With both end caps 156, 158 being open end caps, the first filter element 106 may be referred to as a double open ended filter element. As illustrated in FIG. 5, the inlet port 112 is in fluid communication with the central cavity 154 through opening 164. Further, a portion of second annular wall 142 extends axially into opening 164.

Because the first and second end caps 156, 158 are open end caps, the end that is not engaged with the filter head 110 must be closed to force dirty fluid to flow through the filter media 148. When a filter element of this type is mounted in the filter housing assembly 102, the cover member 128 operably closes opening 166. In a preferred embodiment, the cover member 128 can be entirely axially received within the housing body 116 (e.g. as illustrated in FIG. 1).

Figure 7:
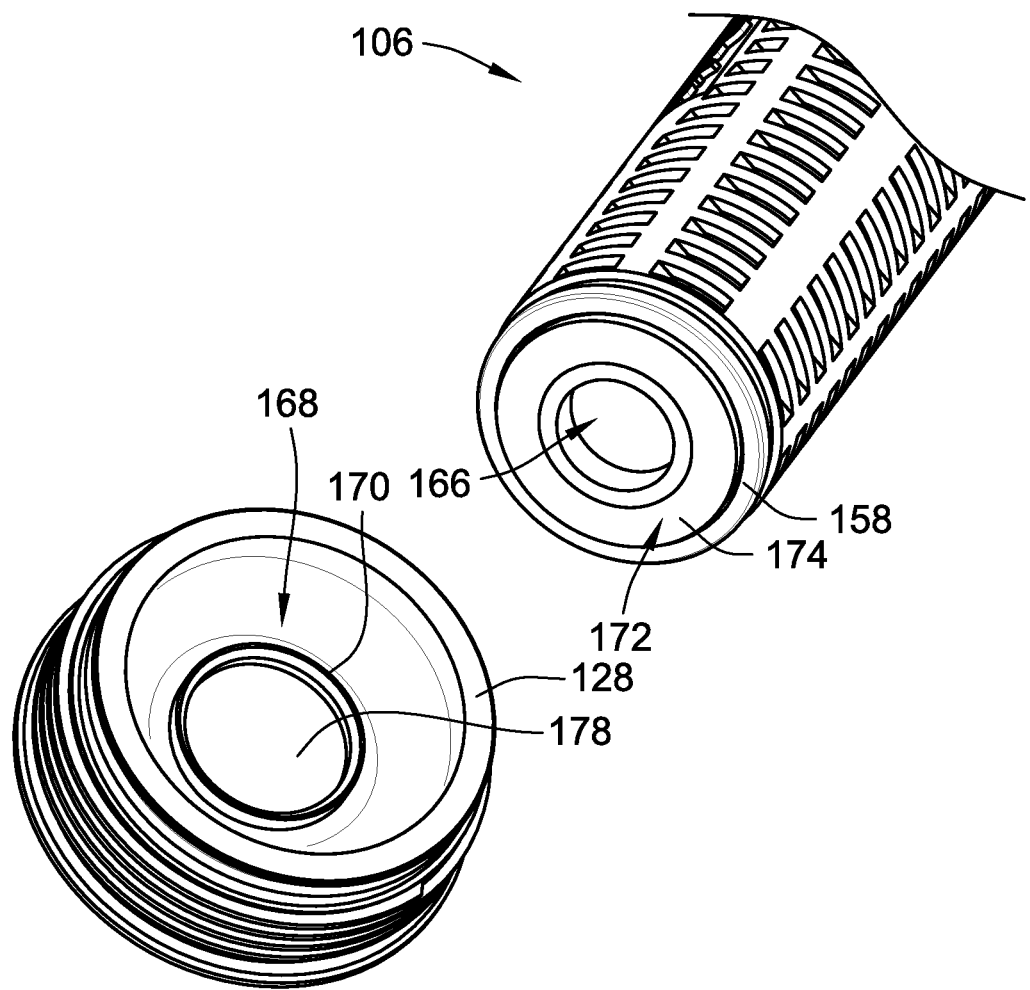
FIG. 7 is a perspective illustration of the cover member of the filter housing assembly of FIG. 3 and a partial illustration of one end of the filter element of FIG. 3.

With reference to FIGS. 5-7, the cover member 128 includes a second housing sealing interface 168 in the form of an axially facing surface that is provided by an annular axially projecting rib 170 that projects axially towards filter head 110. The second housing sealing interface 168 is configured to sealingly mate with, e.g. axially engage, a second sealing interface 172 of the filter element 106 when a filer element of the first type is located within the filter element mounting cavity 126. The second sealing interface 172 is identical to the first sealing interface 138 provided by seal member 160. As such, a second seal member 174 is provided that defines an axially facing surface 176. Again, this corresponds with the fact that the filter element 106 can be installed with either end in engagement with the filter head 110.

The annular axially projecting rib 170 extends from an inner surface of an imperforate closed end 178 of the cover member 128. Further, annular axially projecting rib 170 may have a tapered end portion that narrows towards the second housing sealing interface 172 similar to housing sealing interface 136 described above.

With reference to FIG. 4, the o-ring 130 is carried by an annular axially extending neck 180 of the cover member 128. The neck extends axially relative to the closed end 178. The neck 180 is sized to extend axially into the housing body 116 and particularly into the open second end 124 defined by collar 120.

The neck 180 has an externally threaded region that cooperate with an internally threaded region of collar 120. As noted above, o-ring 130 cooperates with sealing surface 132. Preferably, the axial dimension D1 of sealing surface 132 is greater than o-ring 130 such that o-ring 130 can seal with sealing surface 132 at varying axial locations. This allows the cover member 128 to be threaded into the housing body 116 to varying axial distances to compensate for variations in the axial length between filter elements. This is particularly beneficial if there are variations in the lengths between filter elements of the first type as sealing of the filter element 106 within the filter housing assembly 102 requires the filter element 106 to be axially compressed between the filter head 110 and cover 128 and particularly between first housing sealing interface 136 and second housing sealing interface 168 to prevent fluid bypass around the filter element 106. In some embodiments, the axial dimension D1 of the sealing surface 132 relative to the sealing member carried by the cover member 128 allows the axial location of the cover member 128 to vary by at least 0.125 inches, more preferably at least 0.25 inches, and even more preferably at least 0.375 inches while still permitting sealing engagement between sealing surface 132 and o-ring 130.

With reference to FIG. 6, the filter element 106 may include inner and outer wrappers 182, 184 to help support the filter media 148 as fluid flows therethrough.

Figure 8:
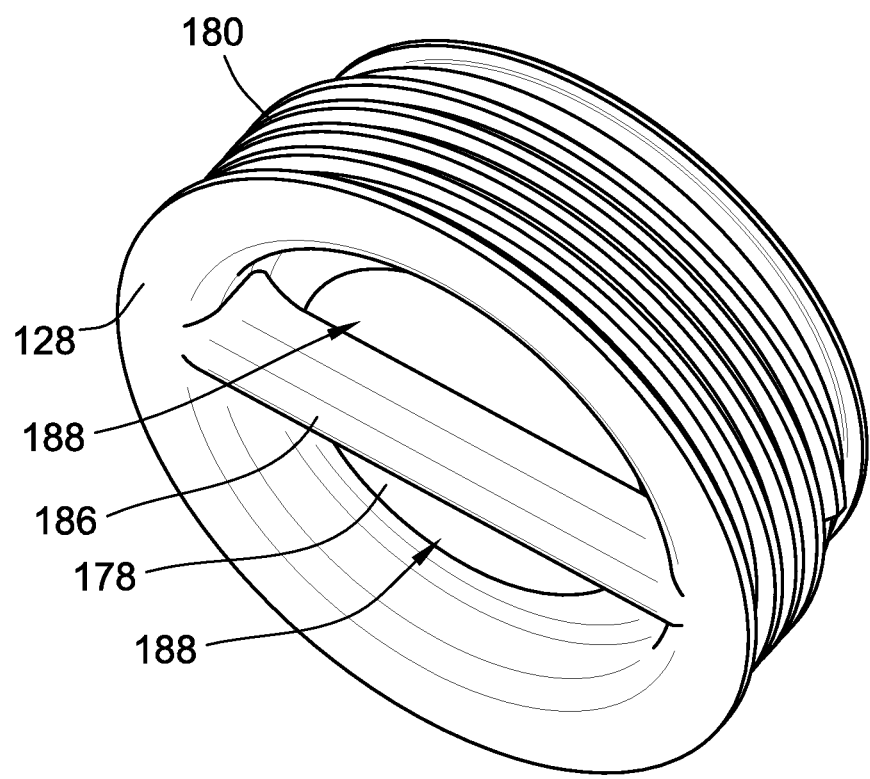
FIG. 8 is a perspective illustration of the cover member of FIG. 7.

With reference to FIG. 8, the closed end 178 of the cover member 128 further defines a handle 186 sized for a user's hand to grip the cover member 128 and applying a torque to attach or detach the cover member 128 from the housing body 116. The handle 186 is defined in part by axially recessed pockets 188 formed by the closed end 178.

Figure 9:
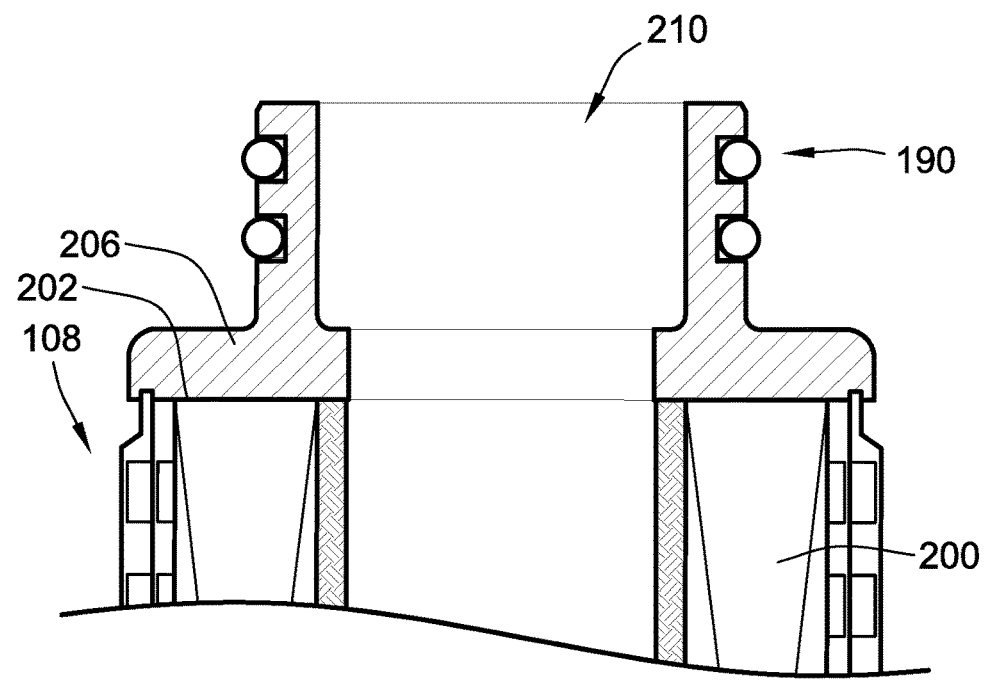
FIG. 9 is a cross-sectional illustration of a second type of filter element that can be installed into the filter housing assembly of FIG. 4.
Figure 9:
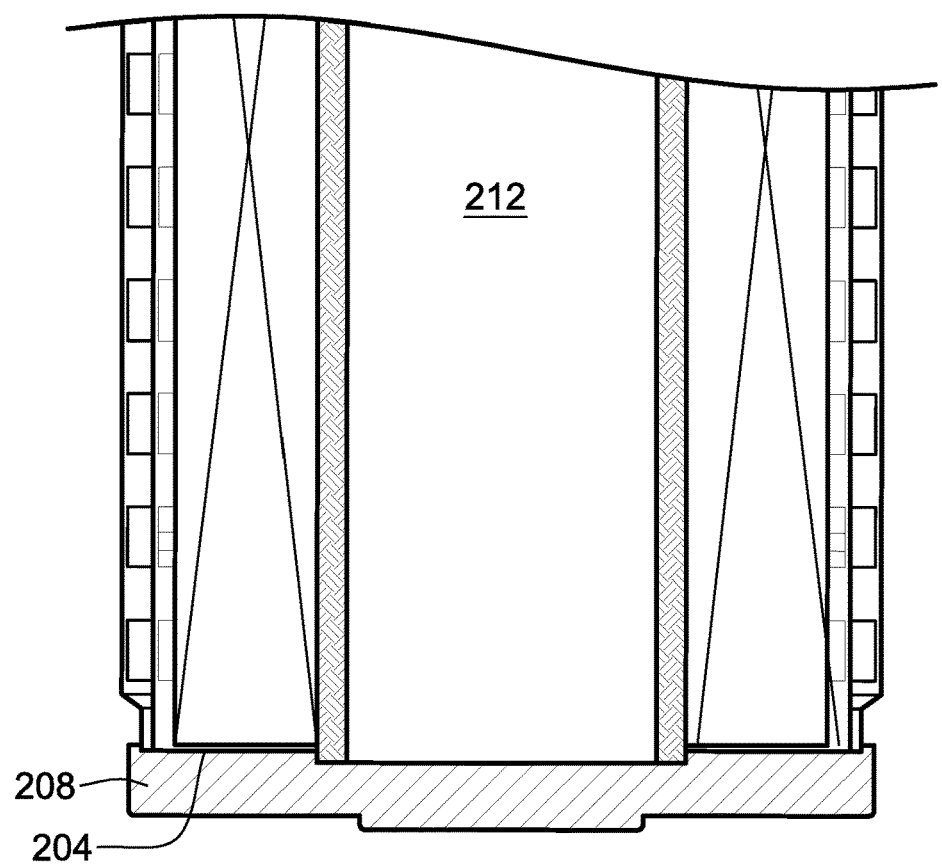
Figure 10:
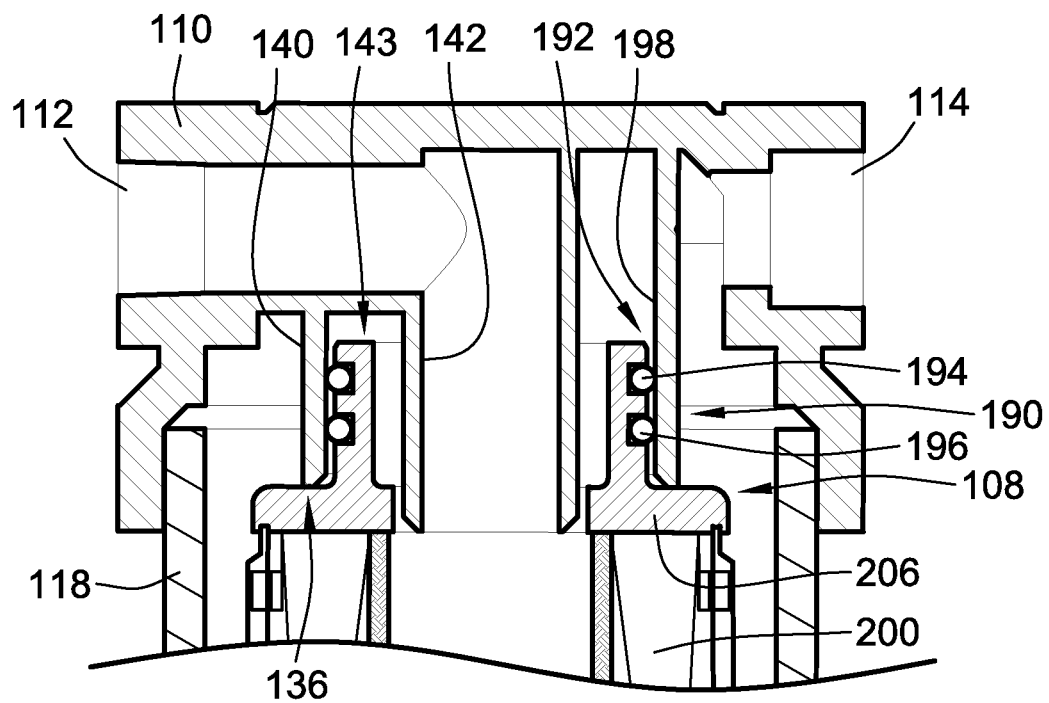
FIG. 10 is a cross-sectional illustration of the second type of filter element of FIG. 9 installed in the filter housing assembly of FIG. 4.
Figure 10:
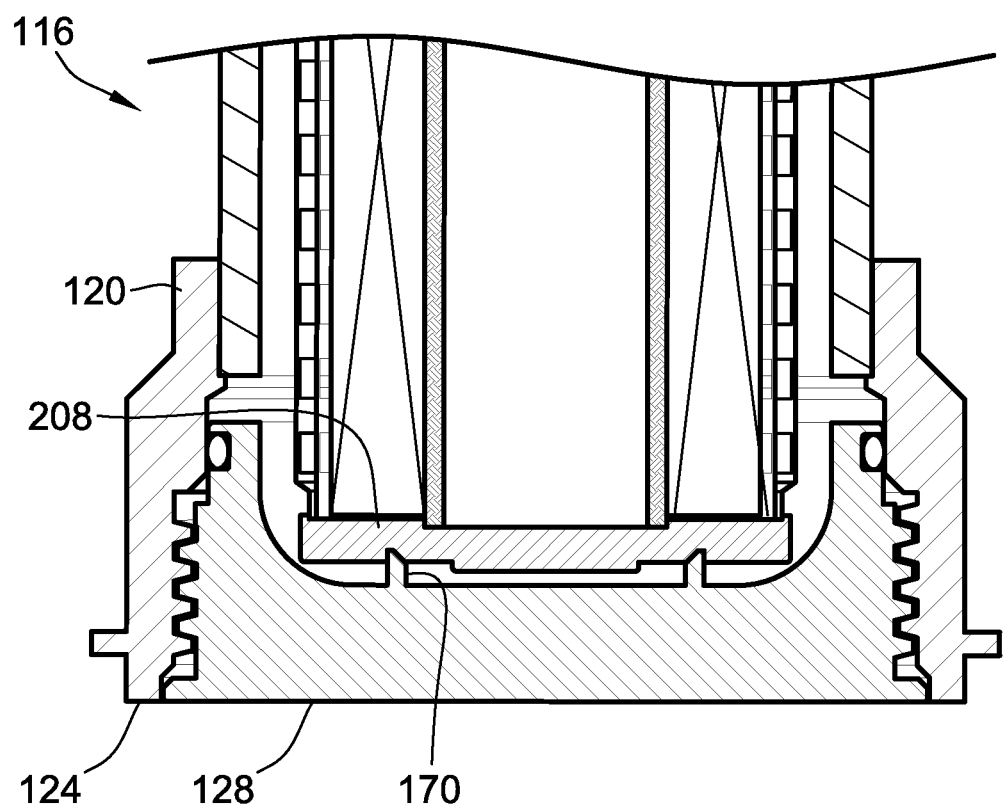
Figure 11:
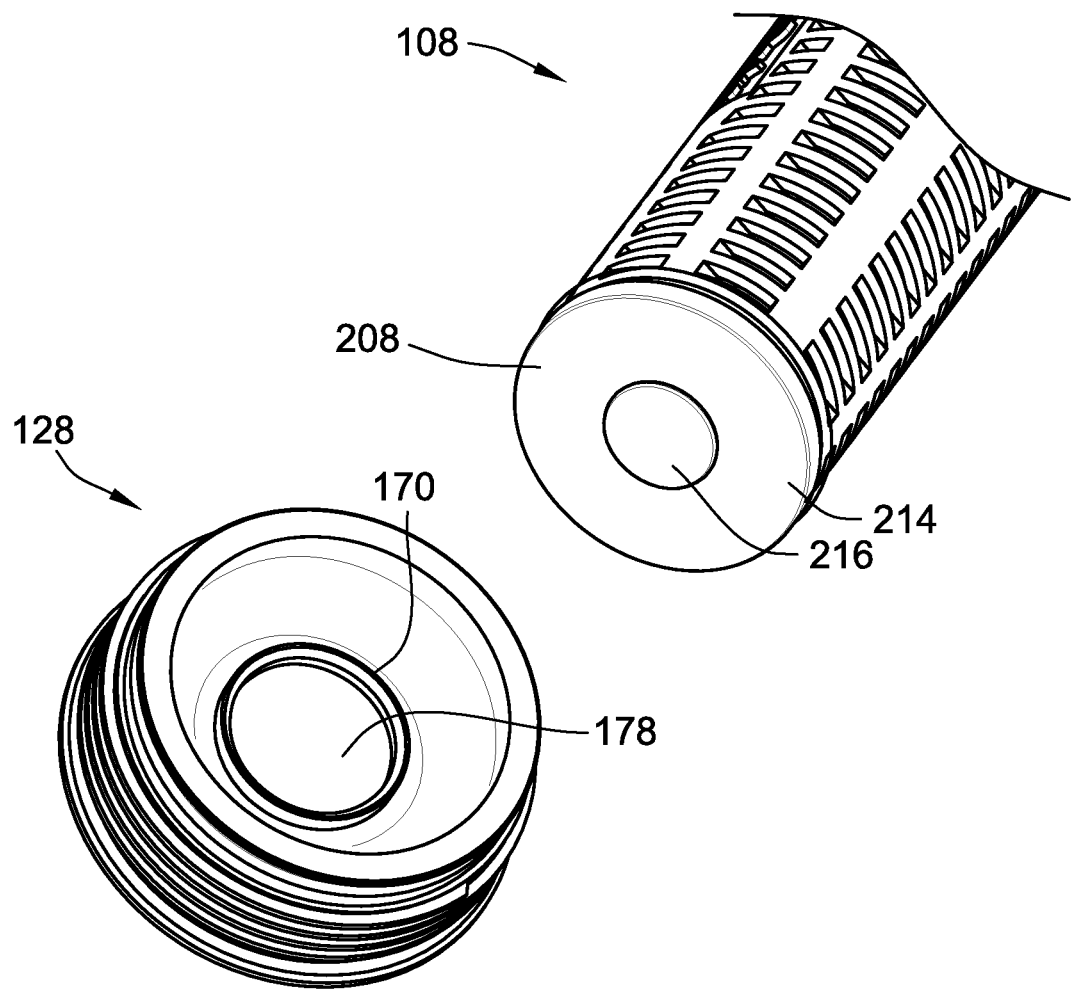
FIG. 11 is a perspective illustration of the cover member of the filter housing assembly of FIG. 4 and a partial illustration of one end of the filter element of FIG. 9.

With reference to FIGS. 9 and 10, the second filter element 108 is the second type of filter element that may be used with filter housing assembly 102. Instead of providing the double open ends and the axially directed sealing interfaces 138, 172, second filter element 108 provides a third sealing interface 190 that cooperates with third housing sealing interface 192 when a filter element of the second type is mounted within the filter housing assembly 102.

The third sealing interface 190 in this embodiment is a radially outward directed sealing interface provided by a pair of axially offset seal members in the form of o-rings 194, 196. The third housing sealing interface 192 is provided by a radially inward directed annular surface 198 of the first annular wall 140 that, in the illustrated embodiment, radially faces the second annular wall 142. Thus, the filter head 110 provides two different housing sealing interfaces to accommodate filter elements that have sealing interfaces that are configured differently from one another. The inner diameter of the housing sealing interface 192, in some embodiments is between about 1.7 and 1.8 inches and is preferably between 1.75 and 1.77 inches.

The second filter element 108 includes a tube of filter media 200 extending axially between opposed first and second ends 202, 204. First and second end caps 206, 208 are attached to ends 202, 204, respectively. The first and second end caps 206, 208 may be similarly formed and attached to filter media 200 as outlined above for end caps 156, 158. The first end cap 206 is an open end cap that includes opening 210 that provides access to a central cavity 212 of filter media 200. The third housing sealing interface 192 surrounds opening 210.

The second end cap 208 is different than the other end caps in that the second end cap 208 is a closed end cap that prevents fluid flow therethrough. As such, the second end cap 208 need not provide a sealing interface. While the second end cap 208 will not carry a sealing interface for sealingly cooperating with cover member 128, the cover member 128 will typically axially abut the axially outer surface 214 of the second end cap 208 to axially and, in some embodiments, radially position the second filter element 108 within the filter housing assembly 102. For example, the second end cap 208 may include an axially extending projection 216 that can radially locate on rib 170.

The distal end of first annular wall 140 which provides the first housing sealing interface 136 may axially abut the first end cap 206 when the second filter element 208 is installed to axially locate the second filter element 108.

Figure 12:
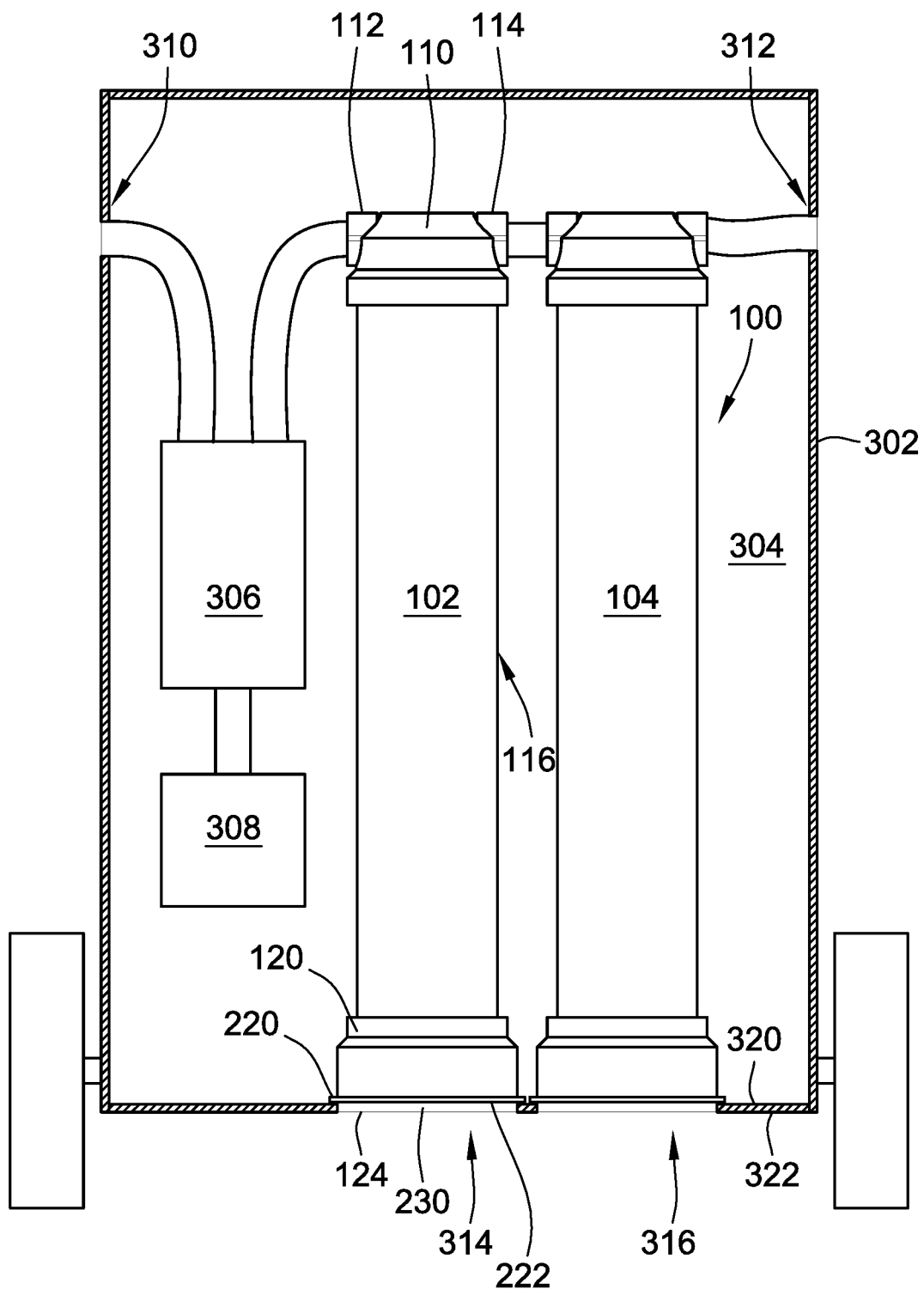
FIG. 12 is a simplified, cross-sectional illustration of a portable filtering apparatus incorporating a filter system of FIG. 1 therein.

FIG. 12 illustrates a portable filtering apparatus 300 that utilizes filter system 100. The portable filtering apparatus 300 finds particular use as a portable water filtering apparatus in harsh environments. The portable filtering apparatus 300 can be used in remote locations for providing clean water. The portable filtering apparatus also finds use for providing clean water during disaster recovery efforts.

The portable filtering apparatus 300 includes a containment enclosure 302 that defines an enclosed volume 304. In some embodiments, a fluid pump 306, a source of power 308 (e.g. a battery and motor or gas powered engine) for powering the fluid pump 306 and the filter system 100 are located within the containment enclosure 302.

The containment enclosure 302 includes one or more sidewalls that provide a plurality of access openings 310, 312, 314, 316 therethrough. In the illustrated embodiment, the first access opening 310 allows for dirty fluid to enter the enclosure 302. The first access opening 310 is in fluid communication with the fluid pump 306 which is then in fluid communication with a dirty side of (e.g. dirty fluid port) first filter housing 102. The second access opening 310 is in fluid communication with a clean side of (e.g. clean fluid port) second filter housing 104. The third and fourth access openings 314, 316 cooperate with the open ends of the filter housings 102, 104 to allow for replacement of spent filter elements housed within the filter housings 102, 104.

While filter housing 102 is not directly connected to second access opening 312, it is operably in fluid communication with second access opening 312. As such, the intervening structure of the second filter housing 104 shall not prevent the clean fluid port 114 of the filter head 110 from being considered to be in fluid communication with access opening 312. This shall similarly be applicable to the dirty fluid port 112 and first access opening 310 in view of intervening pump 306.

Preferably, the containment enclosure 302 is otherwise sealed to prevent damage to the components housed within the containment enclosure 302.

With additional reference to FIG. 4 and to reference to filter housing 102 for explanation purposes, collar 120 includes a radially outward extending projection 220. The projection 220 defines an axially facing axial abutment 222. This axial abutment 222 is axially offset from the open second end 124 of the housing body 116 towards the first end 122.

The axial abutment 222 axially abuts an inner surface 320 of sidewall 322 that surrounds third access opening 314. Thus, housing body 116 and particularly collar 120 can be flush mount to sidewall 322. While not viewable in FIG. 12, the cover member 128 closes all or a portion of the third access opening 314 when it is attached to the housing body 116. When attaching or detaching the cover member 128, the cover member 128 and a least neck 180 extends axially through the third access opening 314.

In the illustrated embodiment, an axially extending portion 230 of annular collar 120 that extends between axial abutment 222 and open end 124 extends through third access opening 314.

While the filter system 102 is not entirely surrounded by containment enclosure 302, substantially all of the volume of the filter system 102 is surrounded by the containment enclosure 302 and preferably at least 80% thereof is housed within the containment enclosure 302, more preferably at least 85%, even more preferably at least 90% and even more preferably at least 95% of the volume is surrounded by the containment enclosure 302. With this arrangement, the majority of the components of the system are housed within the containment enclosure 302 while substantially only the cover member 128 is exposed to the surrounding environment. This prevents damage to the system as well as prevents spillage of water into the containment enclosure 302 during maintenance intervals.

The portable filtering apparatus 300 of the illustrated embodiment includes a pair of wheels 330 for assisting in movement of the apparatus 300. Further, the containment enclosure 302 may be formed from a plurality of components removably attached together to provide selective access to the interior. Additionally, to assist in mobility, the portable filtering apparatus 300 may include wheels, as illustrated schematically.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter housing assembly for use with a first type of filter element having a first sealing interface at a first end of a first tube of filter media and alternatively for use with a second type of filter element having a second sealing interface at a first end of a second tube of filter media and having a third sealing interface at a second end of the second tube of filter media, the first sealing interface being configured differently than the second sealing interface, the filter housing assembly comprising:
    a housing body extending axially between a first end and an open second end, the housing body defining a filter element mounting cavity;
    a filter head being at the first end of the housing body, the filter head including:
    a first housing sealing interface configured to sealingly mate with a first sealing interface when a filter element of the first type is located within the filter element mounting cavity;
    a second housing sealing interface configured to sealingly mate with a second sealing interface when a filter element of the second type is located within the filter element mounting cavity; and
    a cover member removably attachable to the second end of the housing body, the cover member including a third housing sealing interface configured to sealingly mate with a third sealing interface when the filter element of the second type is located within the filter element mounting cavity.

2. The filter housing assembly of claim 1, wherein the first and second housing sealing interfaces are provided by a first annular wall, one of the first and second housing sealing interfaces being provided by a radially directed surface of the first annular wall, the other one of the first and second housing sealing interfaces being provided by an axially facing annular surface of the first annular wall, the axially facing annular surface axially facing the cover member.

3. The filter housing assembly of claim 2, wherein the third housing sealing interface is an axially facing surface provided by the cover member axially facing the first end.

4. The filter housing assembly of claim 3, wherein the third housing sealing interface is provided by an annular rib projecting axially towards the filter head.

5. The filter housing assembly of claim 2, wherein the first housing sealing interface is provided by the radially directed surface of the first annular wall and the radially directed surface of the first annular wall is a radially inward directed surface.

6. The filter housing assembly of claim 5, wherein:
    a first port is provided by a second annular wall that is concentric with the first annular wall;
    the first and second annular walls defining an annular channel radially therebetween; and
    the radially directed surface radially faces inward toward the second annular wall.

7. The filter housing assembly of claim 6, wherein the first and second housing sealing interfaces surround, at least part of, the first port.

8. The filter housing assembly of claim 5, wherein the axially facing annular surface has an inner diameter of between about 1.7 and 1.8 inches.

9. The filter housing assembly of claim 8, wherein the axially facing annular surface of the first annular wall that provides the second housing sealing interface is dimensioned to contact a second sealing interface of a filter element of the second type having an inner diameter of 1.25 inches and an outer diameter of 2.5 inches.

10. The filter housing assembly of claim 5, wherein the second housing sealing interface is provided by a tapered end portion of the first annular wall.

11. The filter housing assembly of claim 1, wherein:
    the housing body provides a threaded region and a radially inward directed annular sealing surface having a first axial dimension;
    the cover member has an axially extending neck that is received axially within the second end of the housing body, the neck has a threaded region configured to engage the threaded region of the housing body, the neck carrying a radially directed cover seal member;
    the radially directed cover seal member is radially engageable with the radially inward directed annular sealing surface along the first axial dimension such that the axial position of the cover member may be adjusted relative to the housing body to accommodate different length filter elements within the housing body with the radially inward directed annular sealing surface remaining in sealing engagement with the radially directed cover seal member.

12. The filter housing assembly of claim 11, wherein the axial position of the cover member is adjustable by at least 0.125 inches relative to the housing body with the radially inward directed annular sealing surface remaining in sealing engagement with the radially directed cover seal member.

13. The filter housing assembly of claim 11, wherein:
the housing body is provided by an axially extending annular pipe extending between first and second ends and an annular collar member;
the first end is adjacent the filter head and the second end of the annular pipe is attached to the annular collar member, the annular collar member defining the open second end of the housing body; and
the cover member removably attaches to the collar member.

14. The filter housing assembly of claim 1, wherein the housing body includes a radially extending projection defining an axial abutment; and
the radially extending projection and axial abutment are axially offset from the open second end toward the first end.

15. A method of mounting a filter element in a filter housing assembly, the method comprising:
inserting a filter element into a filter housing assembly according to claim 1, the filter element being of the first type or of the second type;
sealingly engaging the filter element to the filter head, which includes:
engaging the first sealing interface with the first housing sealing interface if the filter element is of the first type;
engaging the second sealing interface with the second housing sealing interface if the filter element is of the second type; and
attaching the cover member to the housing body to close the second end of the housing body.

16. The method of claim 15, further comprising engaging the third housing sealing interface with the third sealing interface if the filter element is of the second type.

17. The method of claim 15, wherein the first housing sealing interface is left unused if the filter element is of the second type and the second housing sealing interface is left unused if the filter element is of the first type.

18. The method of claim 15, wherein the filter housing assembly is located within a containment enclosure of a fluid filtering apparatus, the containment enclosure defining an enclosed volume defined at least in part by a first sidewall, the first sidewall including a first access opening that cooperates with the open second end such that the filter element mounting cavity is accessible from exteriorly of the containment enclosure through the first access opening and the open second end; and
the step of inserting a filter element into the filter housing assembly includes passing the filter element through both the access opening and the open second end.

19. The method of claim 15, wherein the cover member is removably attached to the housing body during the step of attaching the cover member to the housing body to close the second end of the housing body.

20. The filter housing of claim 1, wherein the housing body and the filter head are reusable.

* * * * *